United States Patent
Khorram

(10) Patent No.: US 6,762,642 B2
(45) Date of Patent: Jul. 13, 2004

(54) METHOD AND APPARATUS FOR FREQUENCY SHIFT-KEYING DEMODULATION AND APPLICATIONS THEREOF

(75) Inventor: Shahla Khorram, Los Angeles, CA (US)

(73) Assignee: Broadcom, Irvine, CA (US)

( * ) Notice: Subject to any disclaimer, the term of this patent is extended or adjusted under 35 U.S.C. 154(b) by 0 days.

(21) Appl. No.: 10/395,569

(22) Filed: Mar. 24, 2003

(65) Prior Publication Data

US 2004/0036527 A1 Feb. 26, 2004

Related U.S. Application Data

(63) Continuation of application No. 10/037,246, filed on Oct. 23, 2001, now Pat. No. 6,566,940.

(51) Int. Cl.[7] ............................. H03D 3/00; H04L 27/14
(52) U.S. Cl. ...................... 329/300; 329/302; 375/324; 375/334
(58) Field of Search ................................. 329/300–304; 375/324, 334–337

(56) References Cited

U.S. PATENT DOCUMENTS 4,027,266 A * 5/1977 Clark .......................... 329/302

* cited by examiner

*Primary Examiner*—David Mis
(74) *Attorney, Agent, or Firm*—Timothy W. Markison

(57) ABSTRACT

A method and apparatus for frequency shift-keying (FSK) demodulation includes processing that begins by generating a charge signal, a data acquisition signal, and a reset signal from an I component and a Q component of an FSK modulated signal. The processing continues by generating a delta frequency signal based on the charge signal, the data acquisition signal, and the reset signal. The delta frequency signal is representative of the frequency difference used within the FSK modulation to indicate a logic 1 and a logic 0. The processing then continues by demodulating the delta frequency signal to recapture a stream of data.

10 Claims, 6 Drawing Sheets radio receiver 10 timing diagram for FIG. 2

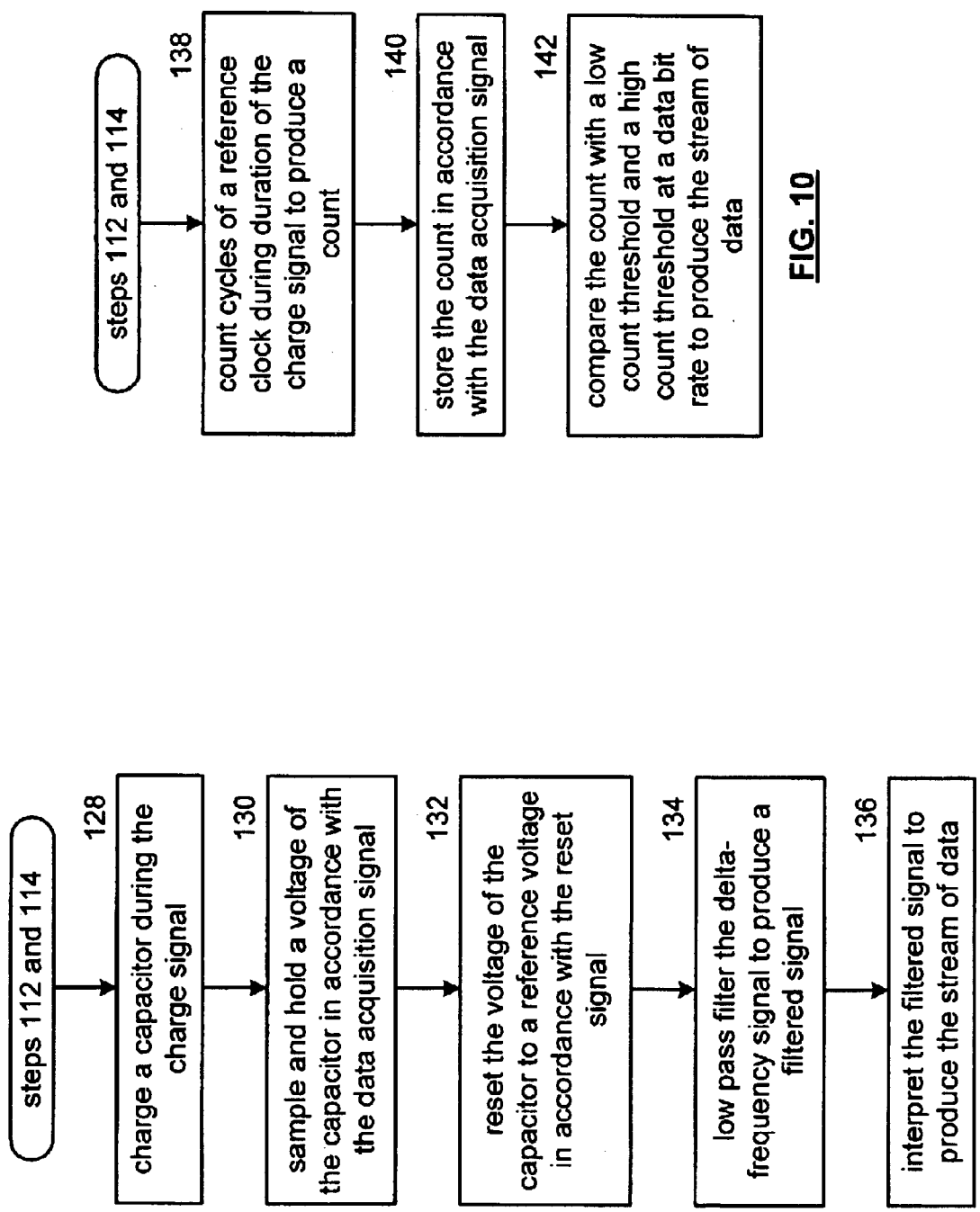

METHOD AND APPARATUS FOR FREQUENCY SHIFT-KEYING DEMODULATION AND APPLICATIONS THEREOF

This patent application is claiming priority under 35 USC §120 to pending patent application entitled METHOD AND APPARATUS FOR FREQUENCY SHIFT-KEYING DEMODULATION AND APPLICATIONS THEREOF, having a Ser. No. of 10/037,246, and a filing date of Oct. 23, 2001 now U.S. Pat. No. 6,566,940.

TECHNICAL FIELD OF THE INVENTION

This invention relates generally to wireless communications and more particularly to demodulation within a wireless radio receiver.

BACKGROUND OF THE INVENTION

The use of wireless communication for in-home and/or in-building networks and/or point to point communications is increasing in popularity and spawning relatively new standards including, but not limited to Bluetooth, IEEE 802.11a, IEEE 802.11b, et cetera. As is known for wireless communications, data is modulated on to at least one RF (radio frequency) carrier frequency and transmitted as a RF modulated signal by a radio transmitter. A radio receiver receives the RF modulated signal and demodulates it to recapture the data.

As is further known, there are a variety of modulation/demodulation protocols that may be used for wireless communications. Such modulation and demodulation protocols include amplitude modulation (AM), frequency modulation (FM), amplitude shift-keying (ASK), frequency shift-keying (FSK), phase shift-keying (PSK), orthogonal frequency division multiplexing (OFDM), or variations thereof. As is also known, Bluetooth utilizes an FSK modulation/demodulation protocol while IEEE 802.11a and IEEE 802.11b utilize an PSK and/or OFDM modulation/demodulation protocol.

Regardless of the particular modulation/demodulation protocol, a radio receiver generally includes an antenna section, a low noise amplifier, a down conversion mixer, an intermediate frequency (IF) stage, and a demodulator. In operation, the antenna section receives RF modulated signals and provides them to the low noise amplifier, which amplifies the received RF signals and provides the amplified RF signals of interest to the down conversion mixer, which down converts the frequency of the RF signals to an intermediate frequency based on a local oscillation. The IF stage includes one or more local oscillators, one or more mixers, and one or more adders to step-down the frequency of the intermediate frequency signals to base-band frequency. The IF stage provides the base-band signal to the demodulator which, based on the modulation/demodulation protocol, recaptures the data.

A demodulator may be implemented using analog and/or digital circuitry. While fully digital demodulators are known and better suited for use in an integrated circuit radio receiver than analog demodulators due to their reduced sensitivity to noise, digital demodulators are complex, are integrated circuit real estate intensive, and relatively costly. Another issue with current digital demodulators is that they consume a relatively large amount of power. For example, a demodulator that uses a local oscillator to convert signals to base-band requires up to 5 milliamps at 3 volts. If the demodulator processes data at the intermediate frequency, the power requirements are 3 milliamps at 3 volts.

Therefore, a need exists for a low power, reliable and reduced complexity mixed signal demodulator.

BRIEF DESCRIPTION OF THE DRAWINGS

FIGS. 6 through 10 illustrate a logic diagram of methods for FSK demodulation in accordance with the present invention.

DETAIL DESCRIPTION OF A PREFERRED EMBODIMENT

Generally, the present invention provides a method and apparatus for frequency shift-keying (FSK) demodulation. Such a method and apparatus includes processing that begins by generating a charge signal, a data acquisition signal, and a reset signal from an I component and a Q component of an FSK modulated signal. The processing continues by generating a delta frequency signal based on the charge signal, the data acquisition signal, and the reset signal. The delta frequency signal is representative of the frequency difference used within the FSK modulation to indicate a logic 1 and a logic 0. The processing then continues by demodulating the delta frequency signal to recapture a stream of data. With such a method and apparatus, a low power, reliable and reduced complexity FSK demodulator is obtained.

Figure 1:
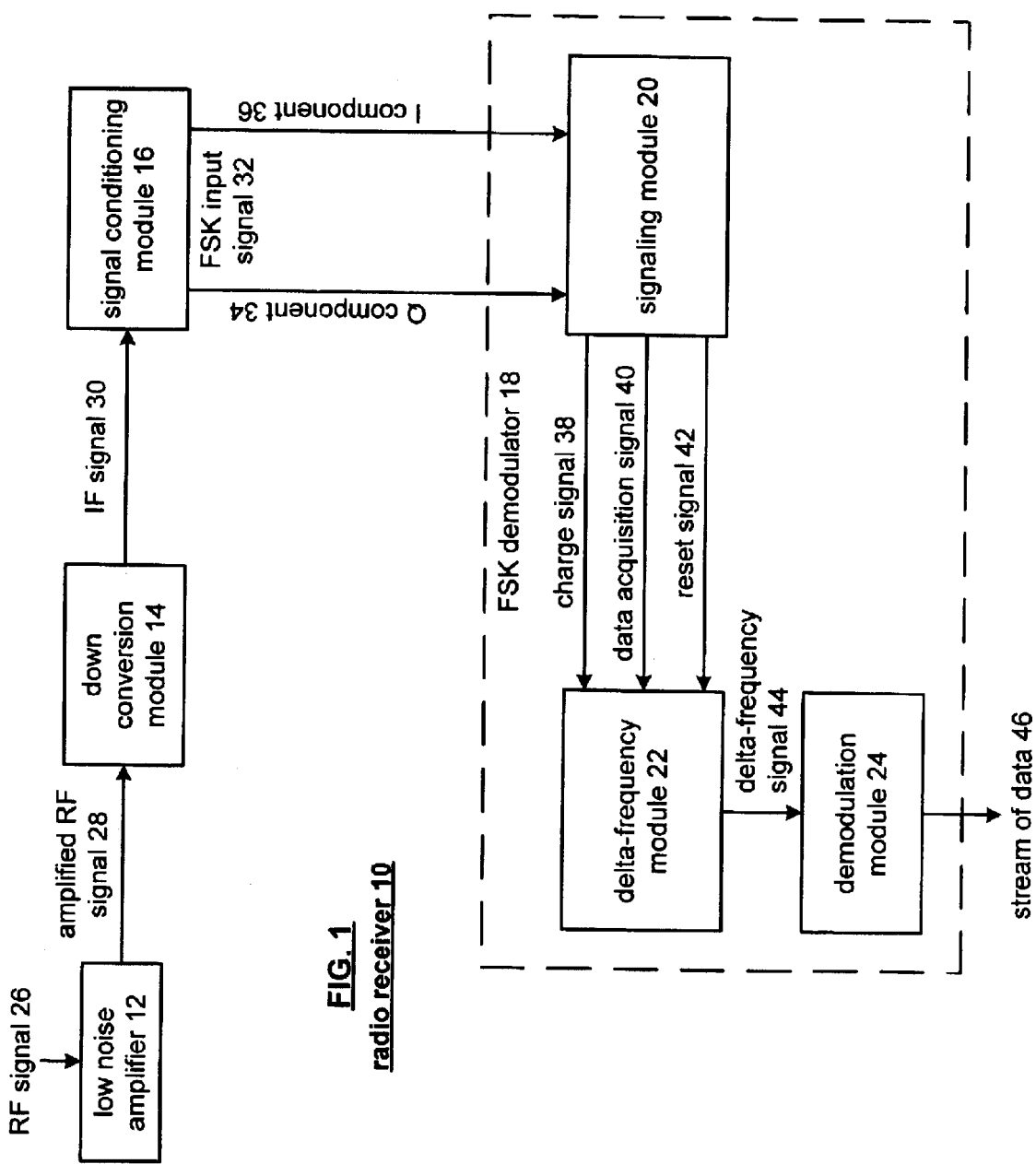
FIG. 1 illustrates a schematic block diagram of a radio receiver in accordance with the present invention.

The present invention can be more fully described with reference to FIGS. 1 through 10. FIG. 1 illustrates a schematic block diagram of a radio receiver 10 that may, be implemented in an integrated circuit as a stand-alone device or as part of an integrated radio. The radio receiver 10 includes a low noise amplifier 12, a down conversion module 14, a signal conditioning module 16, and an FSK demodulator 18. The low noise amplifier 12 is operably coupled to receive an RF signal 26 that is modulated in accordance with an FSK modulation scheme. Such an RF signal 26 may be transmitted and subsequently received in accordance with the Bluetooth standard or other wireless communication standard. The low noise amplifier 12 amplifies the RF signal 26 to produce an amplified RF signal 28.

The down conversion module 14 converts the amplified RF signal 28 into an intermediate frequency signal 30. The intermediate frequency signal 30 may have a frequency of approximately 2 MHz. The signal conditioning module 16 receives the intermediate frequency signal 30 and produces a quadrature (Q) component 34 and in-phase (I) component 36 of an FSK input signal 32. The functioning of the signal conditioning module 16 will be described in greater detail with reference to FIG. 2.

The FSK demodulator 18 includes a signaling module 20, delta frequency module 22, and a demodulation module 24. The signaling module 20 is operably coupled to receive the Q component 34 and I component 36 of the FSK input signal 32. From these signals, the signaling module 20 generates a charge signal 38, a data acquisition signal 40, and a reset signal 42. The operation of the signaling module 20 will be described in greater detail with reference to FIGS. 2, 4 and 6 through 10.

The delta frequency module 22 receives the charge signal 38, data acquisition signal 40 and reset signal 42 and produces therefrom a delta frequency signal 44, which is a time based representation of the frequency difference used to indicate a logic 1 or a logic 0. The demodulation module 24 receives the delta frequency signal 44 and produces a stream of data 46 therefrom.

In an embodiment, the FSK demodulator 18 interprets the pulse duration of the FSK input signal 32, on a pulse-by-pulse basis to produce the charge signal 38, data acquisition signal 40, and reset signal 42. Accordingly, these signals 38, 40, and 42 are generated on a pulse-by-pulse basis. By monitoring the duration of pulses (e.g., by monitoring charging of a capacitor within the delta frequency module 22 in accordance with the charge signal and acquiring the particular voltage imposed on the capacitor in accordance with the data acquisition signal 40), the pulse duration of the FSK input signal 32 may be obtained. Since time is inversely proportional to frequency (i.e., $\Delta T$ is proportional to $\Delta f$ for small $\Delta$), the frequency difference of the FSK input signal 32 may be determined thus allowing the stream of data 46 to be recovered. For instance, $f=1/T \rightarrow f_1-f_2=1/T_1-1/T_2=(T_2-T_1)/(T_1 T_2)$, where $\Delta f=-\Delta t/T^2$ for $T_1 \approx T_2 = T$.

Figure 2:
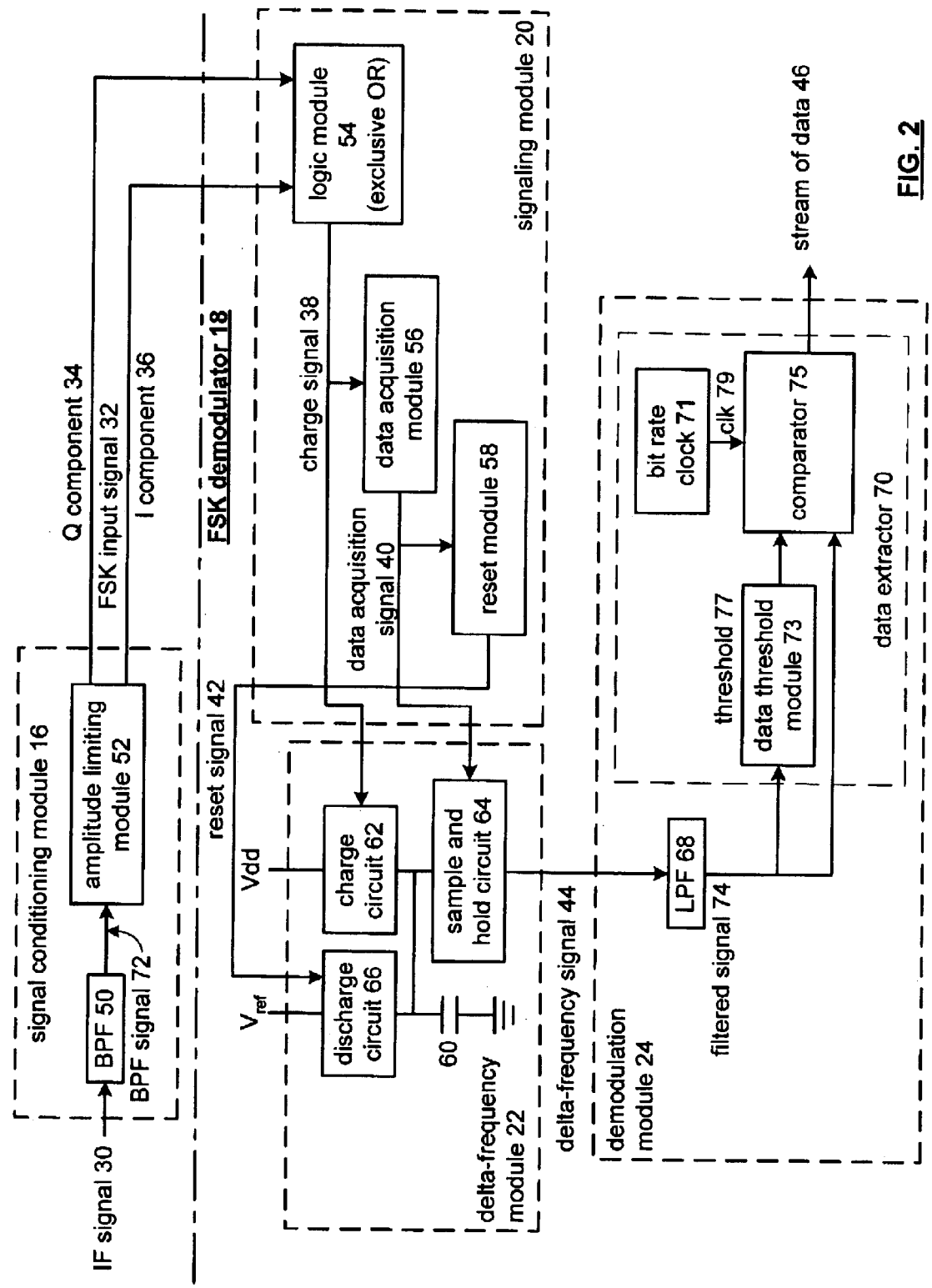
FIG. 2 illustrates a schematic block diagram of an FSK demodulator in accordance with the present invention.

FIG. 2 illustrates a schematic block diagram of the signal conditioning module 16 and the FSK demodulator 18. The signal conditioning module 16 includes a band-pass filter 50 and an amplitude limiting module 52. The band-pass filter 50 filters the intermediate frequency signal 30 to pass only the frequencies of interest (e.g., in the 2 MHz range) to the amplitude limiting module 52. The amplitude limiting module 52 limits the amplitude of the band-pass filtered signal 72 thus creating a more square-wave type signal to represent the FSK input signal 32.

The signaling module 20 includes a logic module 54, data acquisition module 56, and reset module 58. The delta frequency module 22 includes a capacitor 60, a charge circuit 62, a sample and hold circuit 64, and a discharge circuit 66. The demodulation module 24 includes a low pass filter 68, and a data extraction module 70. The data extraction module 70 includes a data threshold module 73, and a comparator 75.

The logic module 54 performs an exclusive OR function on the I component 36 and Q component 34 of the FSK input signal 32 to produce the charge signal 38. The data acquisition module 56 receives the charge signal 38 and produces therefrom the data acquisition signal 40. Essentially, the data acquisition module 56 produces a pulse of a fixed duration that triggers after the falling edge of the charge signal with some desired delay. The reset module 58 receives the data acquisition signal 40 and produces a reset signal 42 therefrom. The reset signal is subsequent in time to the data acquisition signal 40. As such, the reset module 58 is a pulse generator that produces a particular pulse subsequent to the data acquisition pulse 40.

The capacitor 60 is charged via the charge circuit 62, which may be a current source, when the charge signal 38 is active (e.g., high). Once the charge signal 38 is deactive (e.g., low) and the data acquisition signal 40 is activate, the sample and hold circuit 64 samples the voltage impressed across capacitor 60. On a pulse-by-pulse basis the sample and hold circuit 60 samples the capacitor voltage to produce the delta frequency signal 44. Once the voltage of the capacitor has been sampled, the reset signal 42 enables the discharge circuit 66 to dissipate the energy of the capacitor 60, such the capacitor voltage is reset to a reference voltage. At this point, the next pulse triggers the charge signal 38 to again charge the capacitor 60 via charge circuit 62.

The low pass filter 68 filters the delta frequency signal 44 to produce a filtered signal 74. The filtered signal 74 is provided to the data threshold module 73 and comparator 75. The data threshold module 73 generates a data threshold signal 77, which is provided to comparator 75. The comparator generates the stream of data 46 by comparing the filtered signal 74 with the threshold signal 77.

Figure 3:
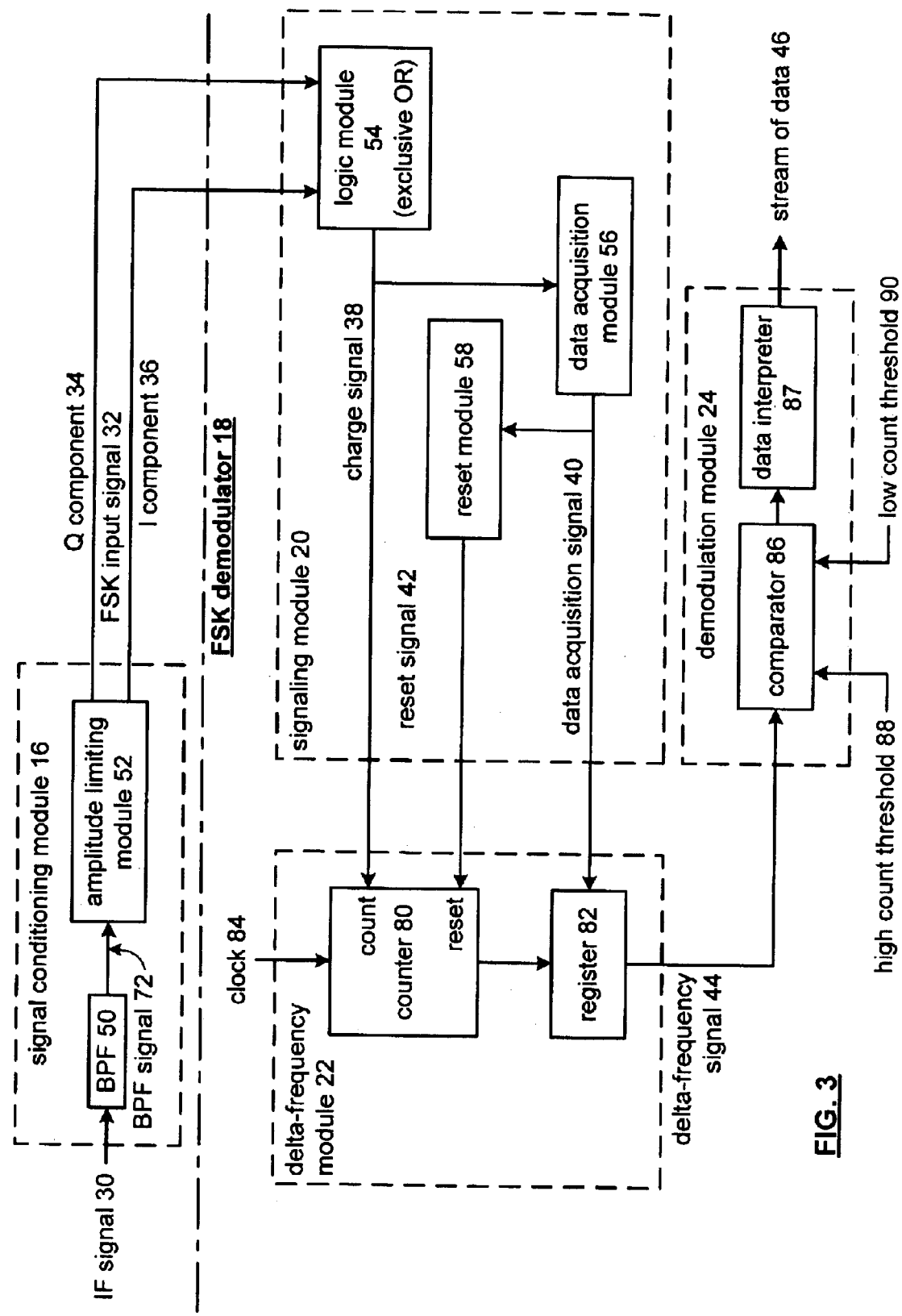
FIG. 3 illustrates a schematic block diagram of an alternate FSK demodulator in accordance with the present invention.

FIG. 3 illustrates an alternate FSK demodulator 18 operably coupled to the signal conditioning module 16. The signaling module 20 includes the logic module 54, reset module 58, and data acquisition module 56 that function as previously described with reference to FIG. 2. The delta frequency modulator 22 includes a counter 80 and a register 82. The counter is clocked via clock 84 at a rate that is much greater than the rate of the FSK input signal 32. The counter 80 counts cycles of clock 84 for the duration of the charge signal 38. The data acquisition signal 40 causes the count for the current charge signal 38 to be read into register 82. The reset signal 42 resets counter 80 such that for the next pulse of charge signal 38, the counter restarts at a predetermined starting value.

The demodulation module 24 includes a comparator 86 and a data interpreter 87. The comparator 86 compares the value stored in register 82 with a high count threshold 88 and a low count threshold 90. The output either indicates that the particular count for a given charge signal is substantially equal to the high threshold or the low threshold. The data interpreter 87 receives the output of the comparator 86 to interpret a sequence of comparator 86 outputs to produce the stream of data 46. In essence, the data interpreter, utilizing the count of counter 80, determines the duration of the pulses, which can then be readily used to determine the frequency difference that represents the logic 1 or logic 0 of the modulated data.

Figure 4:
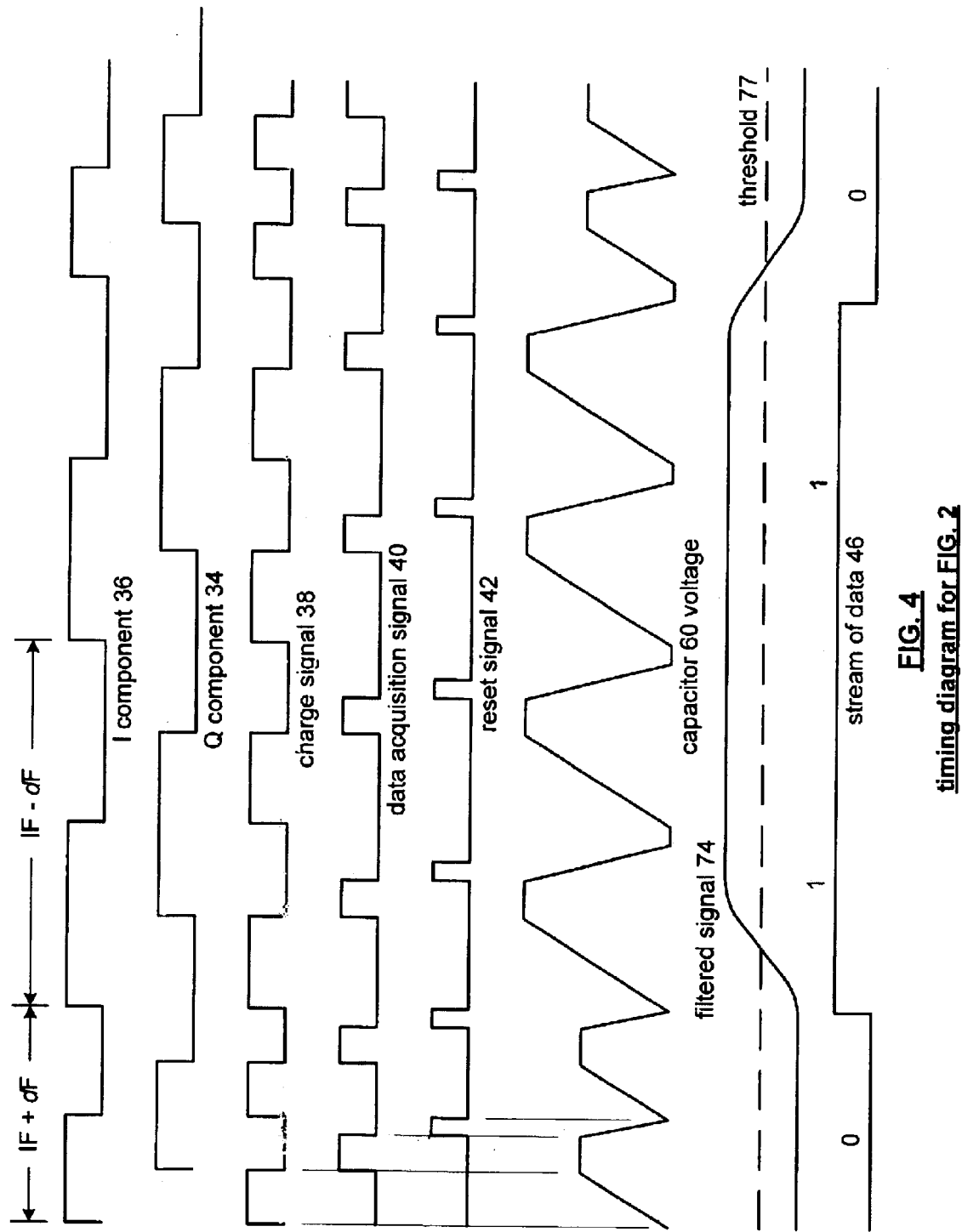
FIG. 4 illustrates a timing diagram corresponding to the demodulation performed by the FSK demodulator of FIG. 2.

FIG. 4 illustrates a timing diagram of the FSK demodulation performed by the FSK demodulator of FIG. 2. As shown, the I component 36 and Q component 34 are phased shifted by 90 degrees. As further shown, the first cycle of the I component 36 and Q component 34 represents the intermediate frequency plus a delta frequency (IF+dF), which may be a modulated representation of a logic 0, and the second pulse shown represents the intermediate frequency less the delta frequency (IF−dF), which may be a modulated representation of a logic 1. As one of average skill in the art will appreciate, the IF+dF may alternatively represent a logic 1 and the IF−dF may alternatively represent a logic 0.

The charge signal 38 represents an exclusive ORing of the I component 36 and the Q component 34. The data acquisition signal 40 is triggered on the trailing edge of the charge signal 38 and may include some delay from the falling edge of the charge signal 38. In addition, the data acquisition signal 40 may be of a fixed duration. The reset signal 42 is triggered on the falling edge of the data acquisition signal 40 or may be triggered with some delay from the falling edge of charge signal 38. The duration of the reset signal 42 is such that the voltage impressed across the capacitor is back at Vref before the next charge signal 38 is initiated.

The capacitor 60 voltage is shown to charge to a first level when the pulse duration corresponds to pulses of the intermediate frequency less the delta frequency and to a larger value when the pulses of the I and Q components 34 and 36 correspond to the intermediate frequency plus the delta frequency. Filtering the capacitor voltage 60 produces filtered signal 74, which, when compared with threshold 77, produces the stream of data 46. Note that the stream of data 46 is produced at the bit rate of the data.

Figure 5:
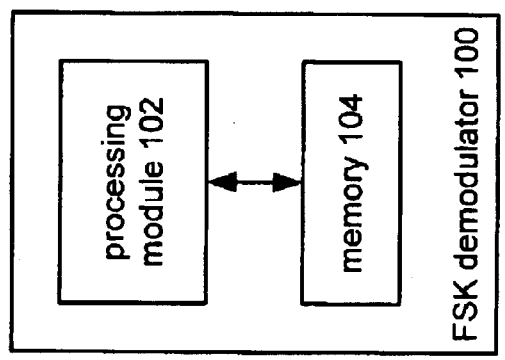
FIG. 5 illustrates a schematic block diagram of an alternate FSK demodulator in accordance with the present invention.

FIG. 5 illustrates a schematic block diagram of an FSK demodulator 100 that includes a processing module 102 and memory 104. The processing module 102 may be a single processing device or a plurality of processing devices. Such a processing device may be a microprocessor, microcontroller, microcomputer, digital signal processor, central processing unit, field programmable gate array, programmable logic device, state machine, logic circuitry, and/or any device that manipulates signals (analog and/or digital) based on operational instructions. The memory 104 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 102 implements one or more of its functions via a state machine or logic circuitry, the memory storing the corresponding operational instructions is embedded within the circuitry comprising the state machine and/or logic circuit. The operational instructions stored in memory 104 and executed by processing module 102 are generally described with reference to FIGS. 6 through 10.

Figure 6:
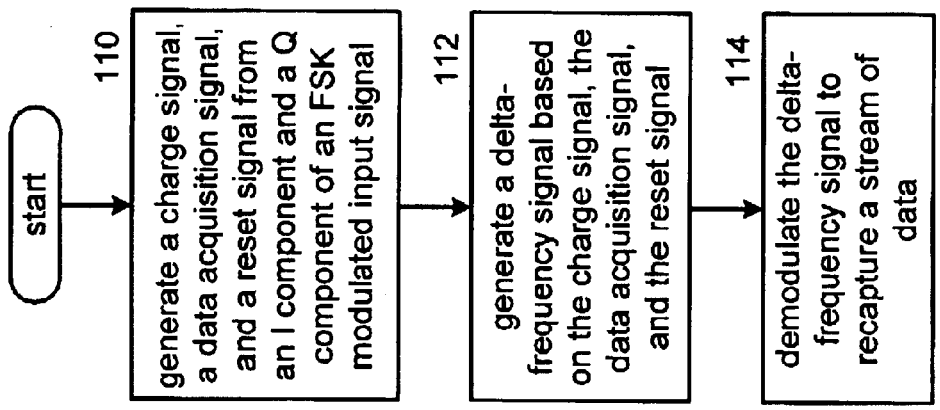

FIG. 6 illustrates a logic diagram of a method for FSK demodulation. The process begins at Step 110 where a charge signal, data acquisition signal and a reset signal are generated from an I component and a Q component of an FSK modulated input signal. The generation of the charge signal may be done by exclusive ORing the I component and the Q component. The generation of the data acquisition signal will be described in greater detail with reference to FIG. 7 and the generation of the reset signal will be described in greater detail with reference to FIG. 8.

The process then proceeds to Step 112 where a delta frequency signal is generated based on the charge signal, the data acquisition signal, and the reset signal. The process then proceeds to Step 114 where the delta frequency signal is demodulated to recapture a stream of data. The processing of Steps 112 and 114 are described in greater detail with reference to FIGS. 9 and 10.

Figure 7:
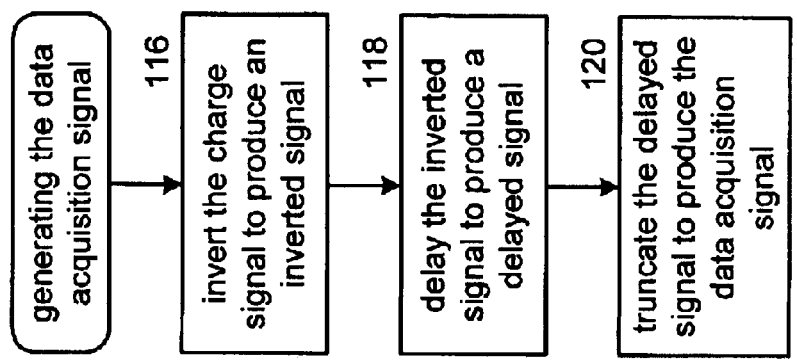

FIG. 7 illustrates a logic diagram for generating the data acquisition signal. The process begins at Step 116 where the charge signal is inverted to produce an inverted signal. The process then proceeds to Step 118 where the inverted signal is delayed to produce a delay signal. The process then proceeds to Step 120 where the delayed signal is truncated to produce the data acquisition signal. This was graphically illustrated in FIG. 4.

Figure 8:
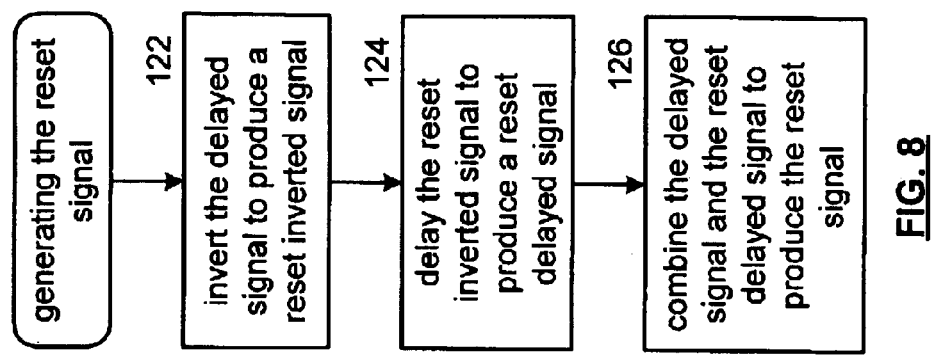

FIG. 8 illustrates a logic diagram for generating the reset signal. The process begins at Step 122 where the delayed signal, which was produced at Step 118 of FIG. 7, is inverted to produce the reset inverted signal. The process then proceeds to Step 124 where the reset inverted signal is delayed to produce a reset delayed signal. The process then proceeds to Step 126 where the delayed signal and the reset delayed signal are combined to produce the reset signal. The resulting reset signal in relation to the data acquisition signal was graphically illustrated in FIG. 4.

FIG. 9 illustrates a logic diagram for a more detailed processing of Steps 112 and 114 of FIG. 6. The process begins at Step 128 where a capacitor is charged during the charge signal. The process then proceeds to Step 130 where a voltage on the capacitor is sampled and held in accordance with the data acquisition signal to produce a delta frequency signal. The process then proceeds to Step 132 where the voltage on the capacitor is reset to a reference voltage in accordance with the reset signal. The process then proceeds to Step 134 where the delta frequency signal is low pass filtered to produce a filtered signal. The process then proceeds to Step 136 where the filtered signal is interpreted to produce the stream of data. The interpreting of the filtered signal may be done by generating a data threshold signal from the filtered signal and comparing the filtered signal with the data threshold at a bit rate clock to produce the stream of data.

FIG. 10 illustrates a logic diagram of an alternate method for processing steps 112 and 114 of FIG. 6. The process begins at Step 138 where cycles of a reference clock are counted during the duration of the charge signal to produce a count. The count is reset in accordance with the reset signal. Note that the reference clock has a much higher rate than the rate of the FSK modulated input signal.

The process then proceeds to Step 140 where the count is stored in accordance with the data acquisition signal. The process then proceeds to Step 142 where the count is compared with a high-count threshold and a low-count threshold at a data bit rate to produce the stream of data. The comparison may further include an interpretation of the resulting comparisons to produce a stream of data.

The preceding discussion has presented a method and apparatus for FSK demodulation. Such an FSK demodulator requires less than 1 milliamp of current at 3 volts. Thus, consumes considerably less power than previous FSK demodulators. As one of average skill in the art will appreciate, other embodiments may be derived from the teaching of the present invention, without deviating from the scope of the claims.

What is claimed is:

1. A method for frequency shift keying (FSK) demodulation, the method comprises, on a pulse-by-pulse basis:

determining a first logic value when a mathematical manipulation of an in-phase component of an FSK modulated input signal and a quadrature component of the FSK modulated input signal yields a value that compares favorably to a threshold; and determining a second logic value when a mathematical manipulation of the in-phase component of the FSK modulated input signal and the quadrature component of the FSK modulated input signal yields a value that compares unfavorably to the threshold.

2. The method of claim 1, wherein the mathematical manipulation further comprises:

generating a pulse having a duration corresponding to the first logic value or the second logic value based on the in-phase component and the quadrature component;

integrating the pulse to produce an integrated value; and sampling the integrated value subsequent to a trailing edge of the pulse to produce the value.

3. The method of claim 2, wherein the generating the pulse further comprises:

exclusive ORing the in-phase component with the quadrature component to produce the pulse.

4. The method of claim 3 further comprises:

generating the pulse to have the duration corresponding to an intermediate frequency plus a delta frequency for the first logic value; and generating the pulse to have the duration corresponding to the intermediate frequency less the delta frequency for the second logic value.

5. The method of claim 2, wherein the integrating the pulse further comprises:

providing the pulse to a capacitor, wherein a voltage imposed on the capacitor provide the integration.

6. A Bluetooth radio receiver comprises:

low noise amplifier operably coupled to amplify a radio frequency (RF) signal to produce an amplified RF signal;

down conversion module operably coupled to down-convert frequency of the amplified RF signal to an intermediate frequency to produce an intermediate frequency (IF) signal;

signal conditioning module operably coupled to condition the IF signal to produce a frequency shift keying (FSK) modulated input signal; and FSK demodulator that recaptures digital values, on a pulse-by-pulse basis, from the FSK modulated input signal by:

determining a first logic value when a mathematical manipulation of an in-phase component of an FSK modulated input signal and a quadrature component of the FSK modulated input signal yields a value that compares favorably to a threshold; and determining a second logic value when a mathematical manipulation of the in-phase component of the FSK modulated input signal and the quadrature component of the FSK modulated input signal yields a value that compares unfavorably to the threshold.

7. The Bluetooth radio receiver of claim 6, wherein the mathematical manipulation further comprises:

generating a pulse having a duration corresponding to the first logic value or the second logic value based on the in-phase component and the quadrature component;

integrating the pulse to produce an integrated value; and sampling the integrated value subsequent to a trailing edge of the pulse to produce the value.

8. The Bluetooth radio receiver of claim 7, wherein the generating the pulse further comprises:

exclusive ORing the in-phase component with the quadrature component to produce the pulse.

9. The Bluetooth radio receiver of claim 8 further comprises:

generating the pulse to have the duration corresponding to an intermediate frequency plus a delta frequency for the first logic value; and generating the pulse to have the duration corresponding to the intermediate frequency less the delta frequency for the second logic value.

10. The Bluetooth radio receiver of claim 7, wherein the integrating the pulse further comprises:

providing the pulse to a capacitor, wherein a voltage imposed on the capacitor provide the integration.

* * * * *